United States Patent [19]
Keller et al.

[11] Patent Number: 5,821,933
[45] Date of Patent: Oct. 13, 1998

[54] VISUAL ACCESS TO RESTRICTED FUNCTIONS REPRESENTED ON A GRAPHICAL USER INTERFACE

[75] Inventors: Neal Martin Keller, Hartsdale; Clifford Alan Pickover, Yorktown Heights, both of N.Y.

[73] Assignee: International Business Machines Corporation, Armonk, N.Y.

[21] Appl. No.: 528,376

[22] Filed: Sep. 14, 1995

[51] Int. Cl.[6] ................................................ G06F 15/00
[52] U.S. Cl. .......................... 345/348; 345/327; 345/332; 707/9
[58] Field of Search ..................... 395/348, 349, 395/350, 351; 340/571, 653, 666, 691; 380/3, 4, 52; 345/327, 329, 331, 332, 348, 349, 350, 351; 707/1, 6, 8, 9

[56] References Cited

U.S. PATENT DOCUMENTS 5,276,314   1/1994   Martino et al. ..................... 235/380
5,561,758  10/1996   Hocker et al. ..................... 345/348

OTHER PUBLICATIONS

J. McLean et al, Access/Control Icons (Icon Keys), IBM Technical Disclosure Bulletin, vol. 38, No. 04, Apr. 1995, pp. 407–409.

Computers and the Imagination, "Pictorial Password Sustems", Chapter 58 St. Martin's Press: New York, 1993.

*Primary Examiner*—Ba Huynh
*Attorney, Agent, or Firm*—Louis J. Percello

[57] ABSTRACT

Computer users access and/or execute a selected restricted function on a computer using a graphical user interface (GUI) by entering an iconic password that is defined by selecting two or more visual icons, called code icons, in a sequence called an iconic password sequence. The entered sequence is compared to a target sequence that represents the restricted function. If the entered sequence matches the target sequence, the user is permitted to execute/access the restricted function. The number of possible combinations in the target sequence, and therefore system security, can be increased by inputting both a code icon and a target site for one or more of the components of the target sequence.

15 Claims, 8 Drawing Sheets

VISUAL ACCESS TO RESTRICTED FUNCTIONS REPRESENTED ON A GRAPHICAL USER INTERFACE

FIELD OF THE INVENTION

This invention relates to computer graphical user interfaces. More specifically, the invention relates to graphical user interface (GUI) allowing users to enter passwords using icons displayed on a computer screen.

BACKGROUND OF THE INVENTION

Graphical user interfaces (GUIs) provide ways for users of computers and other devices to effectively communicate with the computer. In GUIs, available applications and data sets are often represented by icons consisting of small graphical representations which can be selected by a user and moved on the screen. The selection of icons often takes the place of typing in a command using a keyboard in order to initiate a program. In general, icons are tiny on-screen symbols that simplify functions like the access to a program, command, or data file. Icons are usually activated or selected by moving a mouse-controlled cursor onto the icon and pressing a mouse button.

GUIs include graphical images on computer monitors and often consist of both icons and windows. (GUIs may also reside on the screens of televisions, kiosks, and automatic teller machines (ATMs).) A computer window is a portion of the graphical image that appears on the monitor and is dedicated to some specific purpose. Windows allow the user to treat the graphical images on the computer monitor like a desktop where various files can remain open simultaneously. The user can control the size, shape, and position of the windows.

In a drag-and-drop GUI, icons are selected and moved to a target icon to achieve a desired effect. For example, an icon representing a computer file stored on disk may be dragged over an icon containing an image of a printer in order to print the file, or dragged over an icon of a trash can to delete the file. A typical user's screen contains many icons, some of which may require additional validation before they can be used. For example, some of the data accessible using an icon representing employee records may be accessed by an employee, but only a manager with appropriate authority can access all of the information.

The prior art has addressed the initiation of secured or restricted functions. For example, (McLean, Pickover, and Winarski (1995) Access/Control Icons (Icons Keys) *IBM Technical Disclosure Bulletin,* 38(4): 407–408) describes the use of an icon, shaped like a "house key" or polygon, which, when dragged onto a "lock" section of another icon, allows a user to gain access to functions provided by the lock icon. A major limitation of this approach arises from the fact that a visible "house key" can be used by anyone who has access to the GUI desktop on which the "house key" is displayed. Prior art also includes (Pickover (1993) *Computers and the Imagination,* St. Martin's Press: New York, Chapter 58) which describes the use of a static picture (like a photograph of a farm) for password entry. For example, a computer may point to different parts of the photo (cow, barn, hay) in a particular order. This ordered picking constitutes a logon password.

PROBLEMS WITH THE PRIOR ART

Most prior art does not use the desktop environment on a GUI to provide a high level of security to restricted functions being accessed and/or executed on the computer system. Some prior art providing a "visual" log on procedure has the limitation of not allowing a user to specify a particular target application in a set of applications.

OBJECTS OF THE INVENTION

An object of this invention is an improved system and method for providing a high level of security when accessing restricted functions using a computer system.

Another object of this invention is an improved system and method for visually accessing secured or restricted functions represented on a GUI.

Another object of this invention is an improved system and method for accessing secured or restricted functions represented on a GUI without the use of a keyboard.

SUMMARY OF THE INVENTION

This invention permits computer users, using a graphical user interface (GUI), to access and/or execute a restricted function selected from two or more restricted functions on a computer by entering an iconic password that is defined by selecting two or more visual icons, called code icons, in a sequence called an iconic password sequence. The entered sequence is compared to a target sequence that represents the restricted function. If the entered sequence matches the target sequence, the user is permitted to execute/access the selected restricted function. Code icons can be selected by pointing with a selection device, dragging and dropping to a target site, touch input, or by other means like speech identification. Target sites can be arbitrary locations (e.g. invisible locations) on the GUI, target icons that represent the restricted function, receptor positions on a "tree icon," and/or other code icons. The number of possible combinations in the target sequence can be increased by inputting both a code icon and a target site for one or more of the components of the target sequence. Restricted functions can be selected by selecting a target icon that represents the restricted function along with the iconic password or by matching an entered iconic password sequence to a target sequence corresponding to the selected restricted function where the matched target sequence is on a list of one or more target sequences.

DETAILED DESCRIPTION OF THE INVENTION

This invention permits users to use a graphical or visual, e.g., an iconic, passwords to access and/or execute restricted functions. These restricted functions can be represented on the GUI by one or more GUI objects 161 that include: icons 161 with static or animated graphics, text, multimedia presentations, and windows displaying TV broadcasts. GUI objects could also include three dimensional images, for example, those used in virtual reality applications. In one preferred embodiment, the restricted function is represented by a GUI object or target icon. The user is required to enter an iconic password in a particular sequence (iconic password sequence) that is the same as a target sequence associated with the restricted function before the system will access and/or execute the restricted function.

Figure 1:
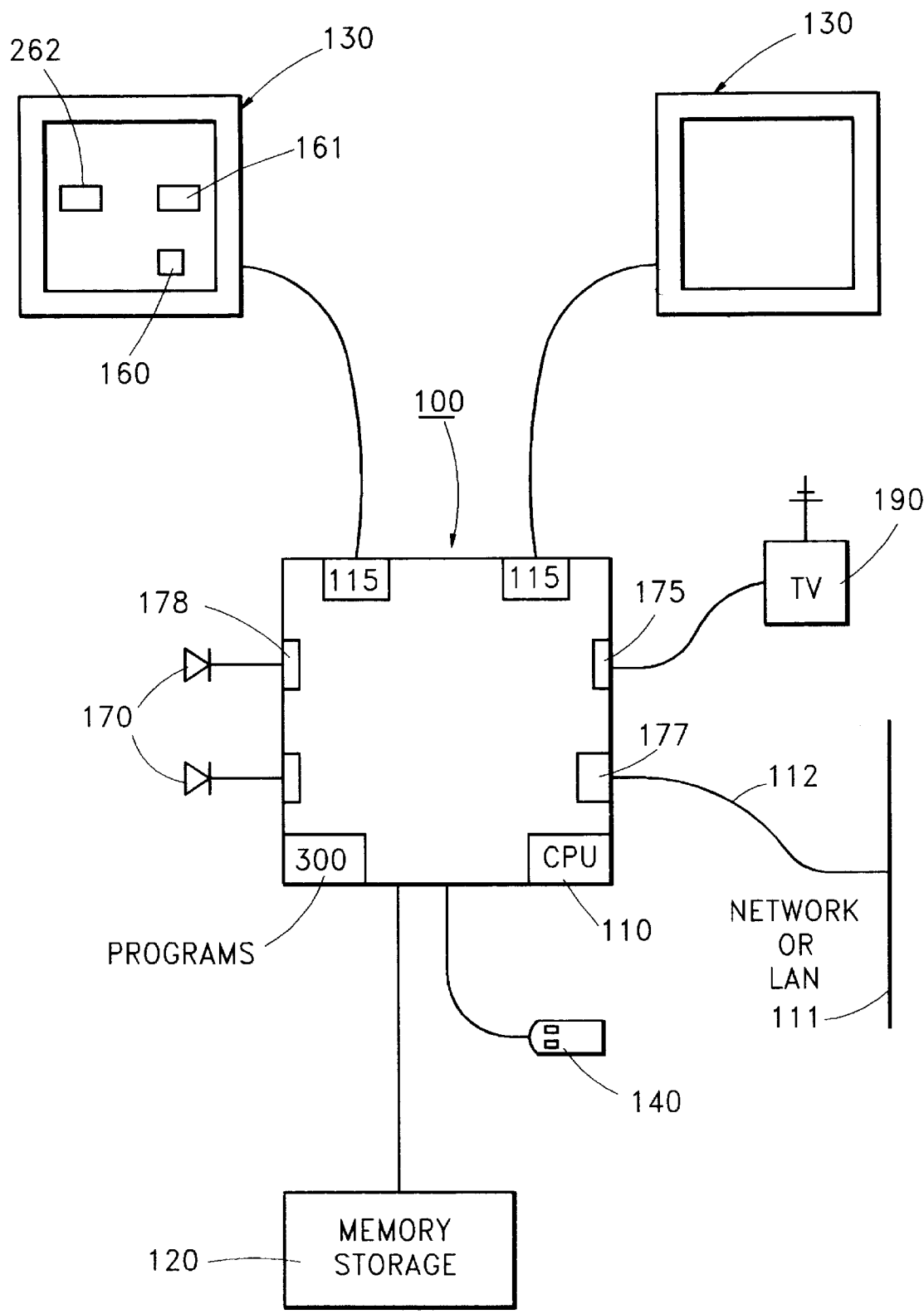
FIG. 1 is a block diagram of one preferred system embodiment of the present invention.

The present invention is capable of running on any general purpose computer system or computer controlled GUI (e.g. a television), including GUIs that have the ability to present multimedia and virtual reality information. One preferred embodiment is schematically represented in a block diagram in FIG. 1. A computer system 100 comprises a central processing unit (CPU) 110, memory storage device 120, one or more monitors or graphical interfaces 130, and selection device 140 such as a mouse or speech recognition system 178. In one embodiment, a IBM RISC SYSTEM/6000 100 comprises a control processing unit (CPU) 110, memory storage device 120, one or more monitors 130, and a mouse 140. The mouse 140 may be used to select GUI objects 161, like icons 161. (Note that icons 161 include target icons 262 and code icons 160 described below.) On an IBM RISC System/6000 multiple monitors 130 can be controlled by multiple monitor adaptor cards 115 such as the IBM RISC System/6000 Color Graphics Display Adaptor. The computer system 100 may also have audio input/output capability 170. An ActionMedia II Display Adapter 175 (described in the IBM ActionMedia II Technical Reference) can be used for audio-video playback 170.

This invention 175 may also be used to display TV broadcasts/signals 190, e.g. "picture-in-picture" of TV broadcasts, and other full motion video and sound audio/visual on the monitors 130.

In addition, speech synthesis or speech recognition 178 may be provided. Recognition may take place using a IBM VoiceType Dictation Adapter.

In an alternative embodiment, the CPU 110 can be connected 112 via a network adaptor 177 to connect the system 100 to the network 111. Network adaptors 177 are well known. Three examples 177 include token ring adaptors, ethernet adaptors, and modems. The system 100 can be connected to other target monitors 130 through a client/server network (or LAN 111).

Systems that can be used to display graphical images, like icons and windows, are well known.

GUIs can be used to control any apparatus having a monitor. In the field of television (TV), channel selection can be performed by selecting an icon consisting of the animated video broadcast on a given channel frequency.

Figure 2:
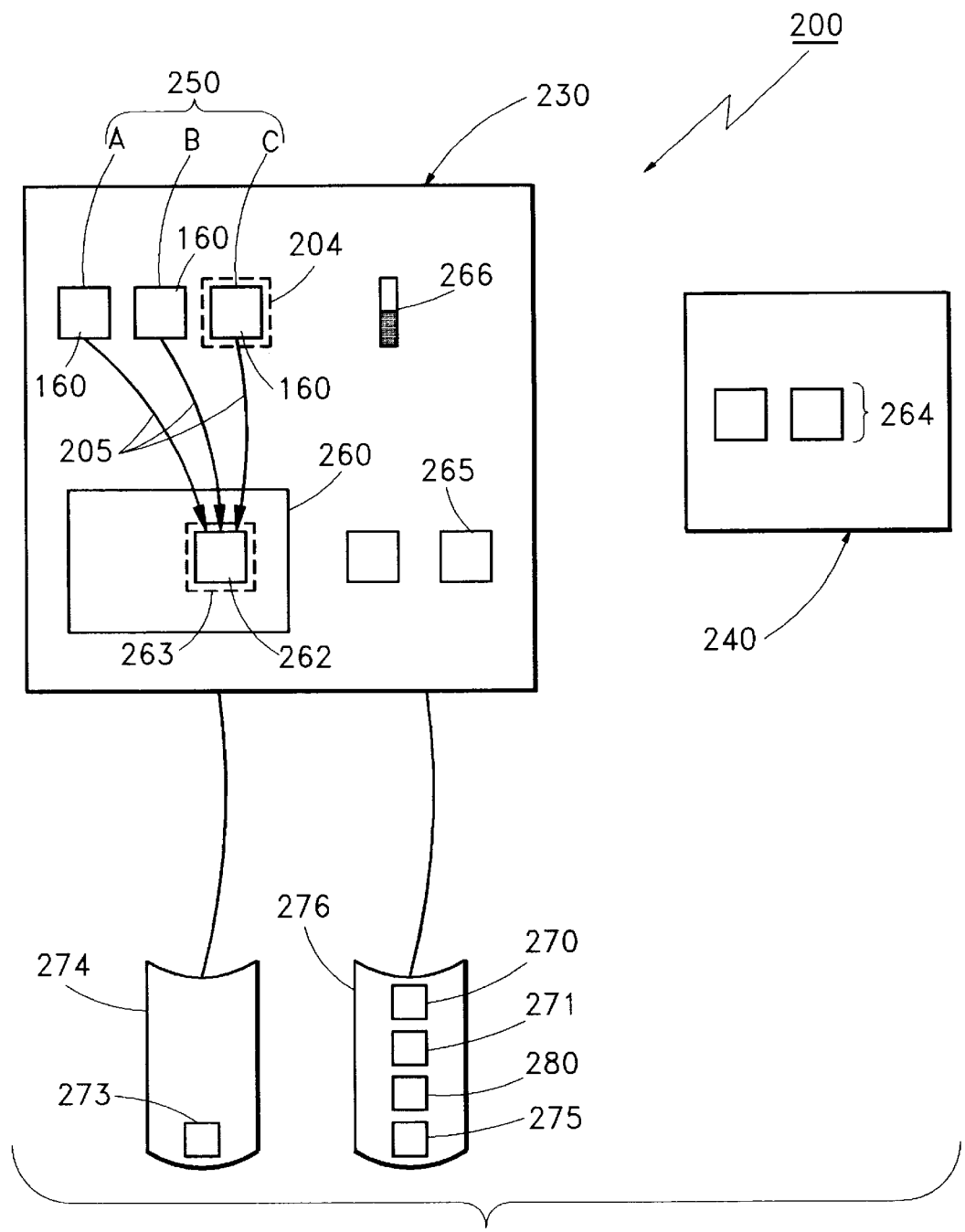
FIG. 2 is a drawing of a system with GUIs displaying code icons and target icons.

FIG. 2 is a block diagram of a system 200 showing a GUI with icons 161 (see FIG. 1) including target icons 262 (optional) and code icons 160. Each target icon 262, optionally displayed on the GUI, represents a restricted function 280. The user uses a selection device (mouse) 140 to select one or more of the code icons 160 in a sequence 250, e.g. selecting code icon A first, code icon B second, and code icon C third. If the sequence 250 matches a target sequence (480 described below) assigned to the restricted function 280, the user is permitted to access the restricted function 280 and/or the system 100 is permitted to execute or executes the restricted function 280. Code icons 160 that are selected by the selection device are called selected code icons 204.

The code icons 160 may or may not be different from other icons 161 on the screen. For example, code icons 160 may look like ordinary application icons in order to heighten the security (user access to the restricted functions 280) of the system 100. Alternatively, code icons 160 may be distinguished (e.g. highlighted, blinking, special shape, special text, number) from the other icons on the GUI to facilitate usage.

The sequence 250 is defined by selecting the selected code icons 204 in any number of ways. In one preferred embodiment, the sequence 250 is defined by selecting the selected code icons 204 with the selection device 140 and dragging 205 each selected code icon 204 to a code target site 260 on the GUI (230, 240). For example, the code target site 260 might be the location of a target icon 262 representing the restricted function 280. In this example, the sequence 250 is the sequence of drags 205 of the selected code icons 204 to the target icon 262.

A restricted function 280 is a program and/or data file that requires the user to provide a password (e.g. target sequence 480 in FIG. 4) before the user can access the restricted function 280 or before the system 100 can execute the restricted function 280. The restricted function 280 requires a password (target sequence 480) if, for example, the name of the restricted function 280 is stored in a data file 273 as described later in the description for FIG. 4.

A target icon 262 is an icon displayed on the GUI that represents a restricted function 280. In some preferred embodiments, target icons 262 are not used. However, in other preferred embodiments, target icons are selected by the selection device 140 to designate which of two or more restricted functions 280 are to be accessed/executed before or after the user enters the sequence 250 of selected code icons 204 that matches the target sequence 480 of the restricted function 280 represented by the target icon. The target icons 262 that are selected by the selection device 140 are called selected target icons 265. Target icons 262 and/or selected target icons 265 can be specially designated 263, e.g. by highlighting. In addition, some of the icons 264 (either code icons 160 or target icons 262) may reside on remote monitor 240 connected to the same computer (local) or connected over a computer network 111.

Once a code icon 160 is selected 204, it may be dragged 205 to a restricted function and/or application 262 represented by a target icon 262. (Note that dragging the code icon 160 to the target icon 262 selects the target icon 265.) After the code icons 160 are selected and dragged in the proper sequence 250 to the target icon 262, the restricted function/application becomes accessible; that is, the restricted function 280 is performed, e.g. accessing a database, initiating a program, or placing an order.

The act of selecting a code and/or target icon may not be done by dragging 205, e.g. actually visibly move code icons 160 to target icon 262, but rather the selection of the icons may be static, where only the mouse driven cursor moves from code icons 160 to target icon 262. Alternatively, the mouse can select a target icon, i.e. a restricted function, and then merely point to the selected code icons in the proper sequence 250. By doing this, it becomes more difficult for an unauthorized person to observe the (iconic) password being entered by the icon selection. In virtual reality application, the selection can be done by touching, looking at, and/or pointing to one or more virtual objects in the virtual space.

The sequence 250 of selections (drags) 205 of specific code icons 160 comprises an "iconic password." A graphical indication of the degree to which an icon password is complete may be given by a graphical indicator 266 such as a thermometer-like symbol in which the interior color rises with each correct iconic password entry. Other indicators may be used, including: graphical dials, sliders, and icons which change size, shape, or color, and audible sounds including speech synthesis 178. The indicator can be used to assist people unfamiliar with password entry, e.g. children. Alternatively, the indicator 266 can be omitted.

The correct passwords to be used by the restricted function (280, target icon 262) are defined by the application program 270 residing in memory 271. The application program 270 may be the application represented by the target icon 262, or it may be a separate master program 276 which contains one or more passwords to be checked against. All appropriate application programs 270 may communicate with the master program to determine whether a proper password is entered. Alternatively, an encrypted data file 273 on disk 274 may contain one or more encrypted passwords, much like the "/etc/password" file encrypted passwords which is standard on UNIX systems to be checked by the application program 270 (master program 276.)

Figure 3:
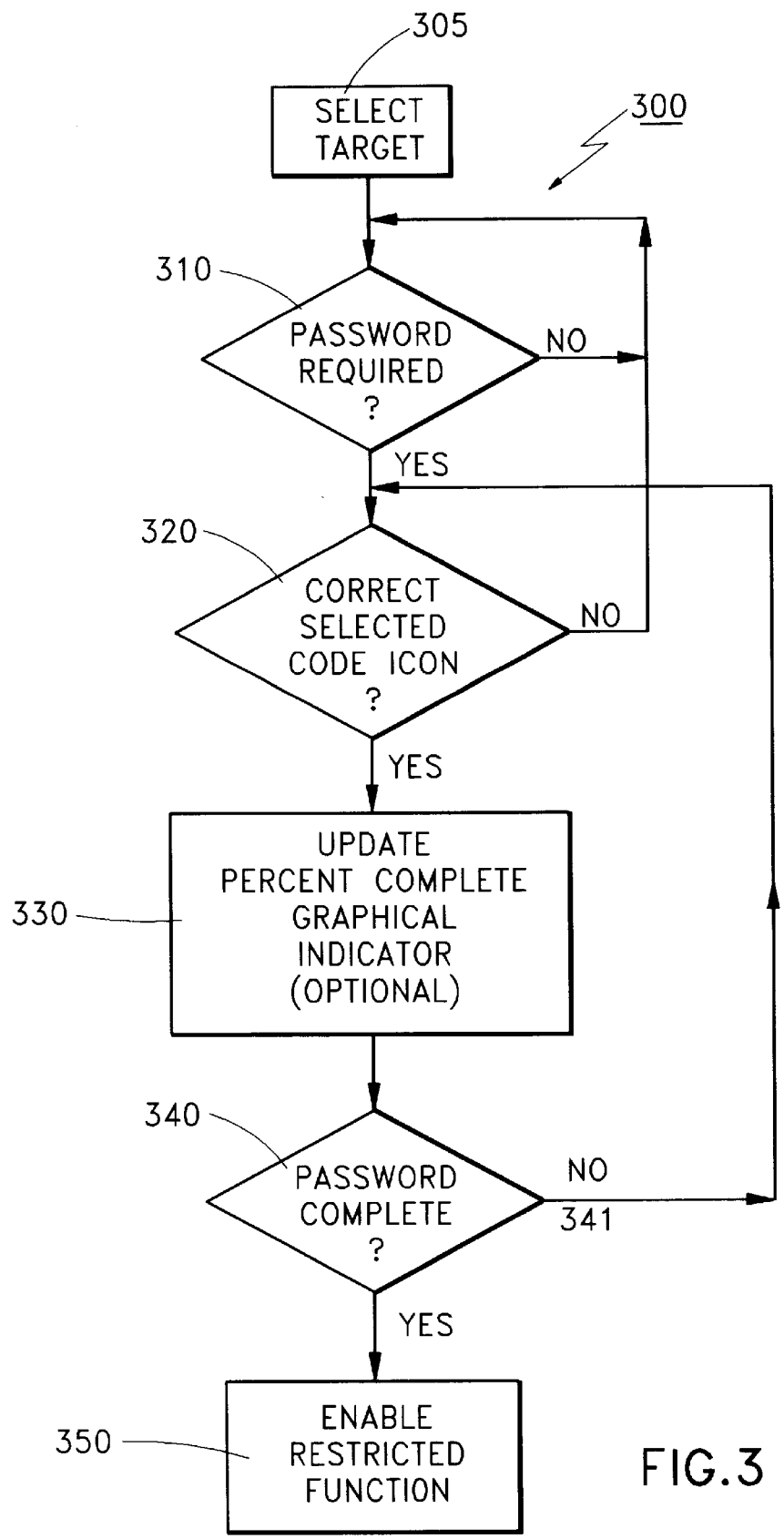
FIG. 3 is a flow chart showing the steps of one preferred method of the present invention.

FIG. 3 is a flow chart showing the steps 300 performed for a preferred version of the iconic password entry executed by system 100 or 200.

In step 305, a selected target icon 265 is selected. The selected target icon 265 is selected by any selection method: e.g., pointing and clicking, dragging one or more selected code icons on a code target site 260 (e.g. the selected target icon 265), or by the application program 270 matching an entered iconic password to a target sequence 480 of a restricted function 280 as described below.

Figure 4:
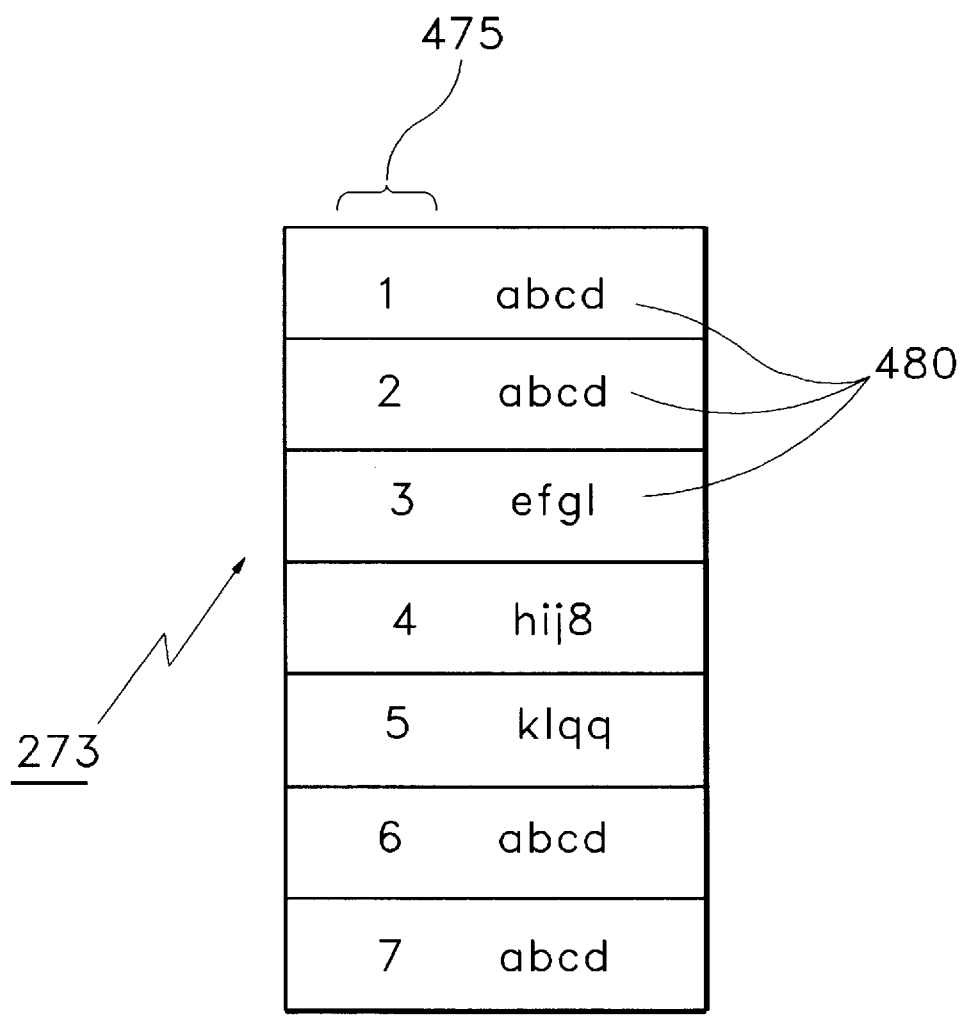
FIG. 4 is a block diagram of a data structure that defines the passwords for each icon.

In step 310, the application program 270 checks the file in FIG. 4 to determine if a password is required for the restricted function 280 represented by the selected target icon 265. If the restricted function 280 name is not in the file, it does not require a password.

Step 320 detects the selections of a code icon 204. The detection of a selected code (dragged) icon 204 by the application program 270 is well known. For example, selection by a drag-and-drop interface is encoded using standard OS/2 PM programming, (Technical Library: Programming Guide Volume II Chapter 33). OS/2 will issue the following messages to an application program 270 when a selected code icon 204 is dragged and dropped on a code target site 260: DM_DRAGOVER, DM_DRAGLEAVE, DM_DROP, DM_DROPHELP. Generally, when an icon is dropped on code target site 260, the Operating System invokes that application with the name of the dropped object as a parameter. The code icon name may be an alphanumeric designator. However, in this invention, before a restricted function 280 (as identified in table 273) is permitted to execute, the proper sequence 250 of selected code icons 204 must be used, i.e., the iconic password must be entered.

In step 320, the application program 270 determines if the correct selected code icon 204 in the sequence 250 has been selected (dropped) by comparing the selected code icon name with an alphanumeric value in a target sequence position of the target sequence 480 of the restricted function 280. This comparison is done 341 for each selected code icon 204 in the entered sequence 250. If a graphical indicator 266 of the degree to which a password is complete is used, then this graphical indicator is sent a signal to update its appearance (step 330) after the comparison 320 is made.

If the password is complete 340, i.e., if the entered password matches a target sequence associated with the restricted function, then the application program 270 permits the restricted function 280 to be enabled 350, e.g. accessed and/or executed. Otherwise 341 the application program 270 waits for the next selected code icon 204 to be selected.

FIG. 4 is a block diagram of one typical preferred data structure 273 that is used to contain alphanumerical name 475 for each restricted function 280 having a target sequence 480. In one preferred embodiment, target sequences 480 are encrypted to prevent unauthorized use of the target sequences 480 in the data structure 273. Encryption and description in passwords is known to those skilled in the art. In the UNIX operating system, the coding scheme is one-way. In other words, there is no way to decode the encoded target sequence 480 to determine the iconic password to be entered to execute the restricted function 280. Therefore in order to test the iconic password sequence (e.g. generated by dragging icons) against the passwords 480, the entered sequence 250 is encoded and then the two encodings are compared in step 320.

Figure 5:
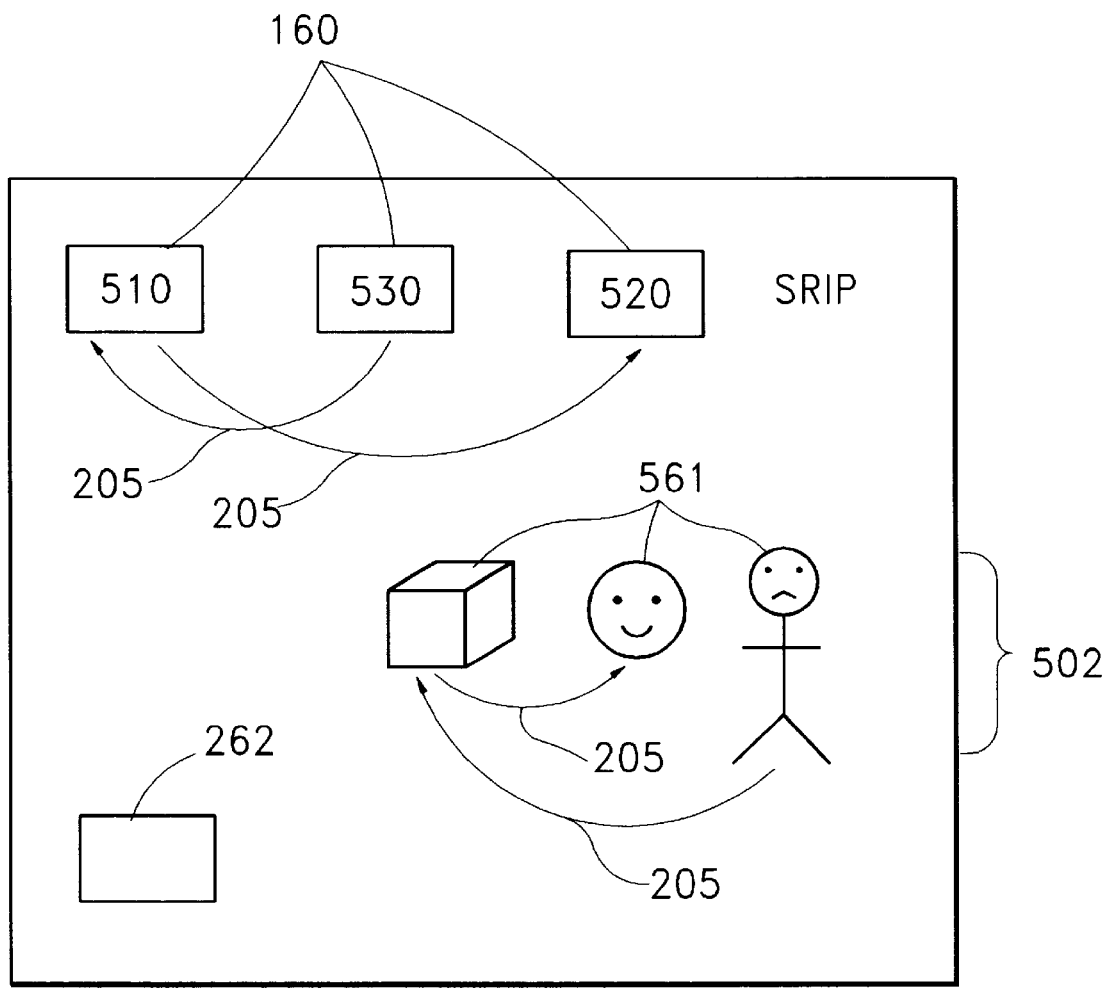
FIG. 5 is a drawing of a GUI used to enter a self-referential iconic password.

FIG. 5 is a block diagram of an alternative preferred embodiment for increasing the number of possible combinations in the iconic password while still using a relatively small number of code icons. In this embodiment, one or more of the components of the iconic password comprise both a selected code icon 204 and a target site 260 on which the selected code icon is placed. In this embodiment, there does not have to be a single target site 260, or even a specific target site that represents the restricted function 280. In fact, icons on the GUI can alternate in function between being a target site 260 and a code icon 160.

For example, the code icons 160 are dragged 205 on top of one another rather than being dragged to the target site 260 (target icon 262) in order to create an iconic password. This is called a "self-referential icon password" (SRIP). For the SRIP, the application program 270 or the master iconic password manager 276 may determine whether the proper password has been entered in a correct sequence 250 of steps using process 300. However, here the correct sequence 250 includes both the selected code icons 204 and the target site 260 on which the selected code icon 204 is placed. This process can be repeated for one or more selected code icons 204 (target sites 260) as the sequence 250 is entered. Further, as the sequence is entered, the icons used as selected code icons 204 and the target sites 260 can change.

In an preferred embodiment, the application program 270 monitors each of the selected code icons 204 and the target site on which it was placed, i.e. pairs of icons (selected code icon and target site) are used in the entered sequence 250. If the sequence of selections 250 is correct 340, then the application is enabled 350.

Using this embodiment greatly increases the number of possible iconic passwords by using a minimal number of GUI icons. For example, a 5-icon iconic password created simply by selecting from three code icons in any particular order (without the drag-and-drop SRIP), produces $3^5$ or 243 different passwords. However, using 5 drags in the SRIP, these same three code icons can potentially produce $3^5 2^5$ or 7776 different passwords because each icon can be dragged to either of two other icons. If there are 10 code icons to choose from, 5 selections produces 100,000 different iconic passwords in the non SRIP case while producing $0.5904900 \times 10^{10}$ different passwords in the SRIP case.

FIG. 5 shows one embodiment where the act of dragging 205 icon 510 on top of 520 and then 530 on top of 510 creates an SRIP password for the restricted function represented by icon 262. Graphical objects 561 may be used instead of two-dimensional icons 160 in a three-dimensional virtual reality environment.

Figure 6:
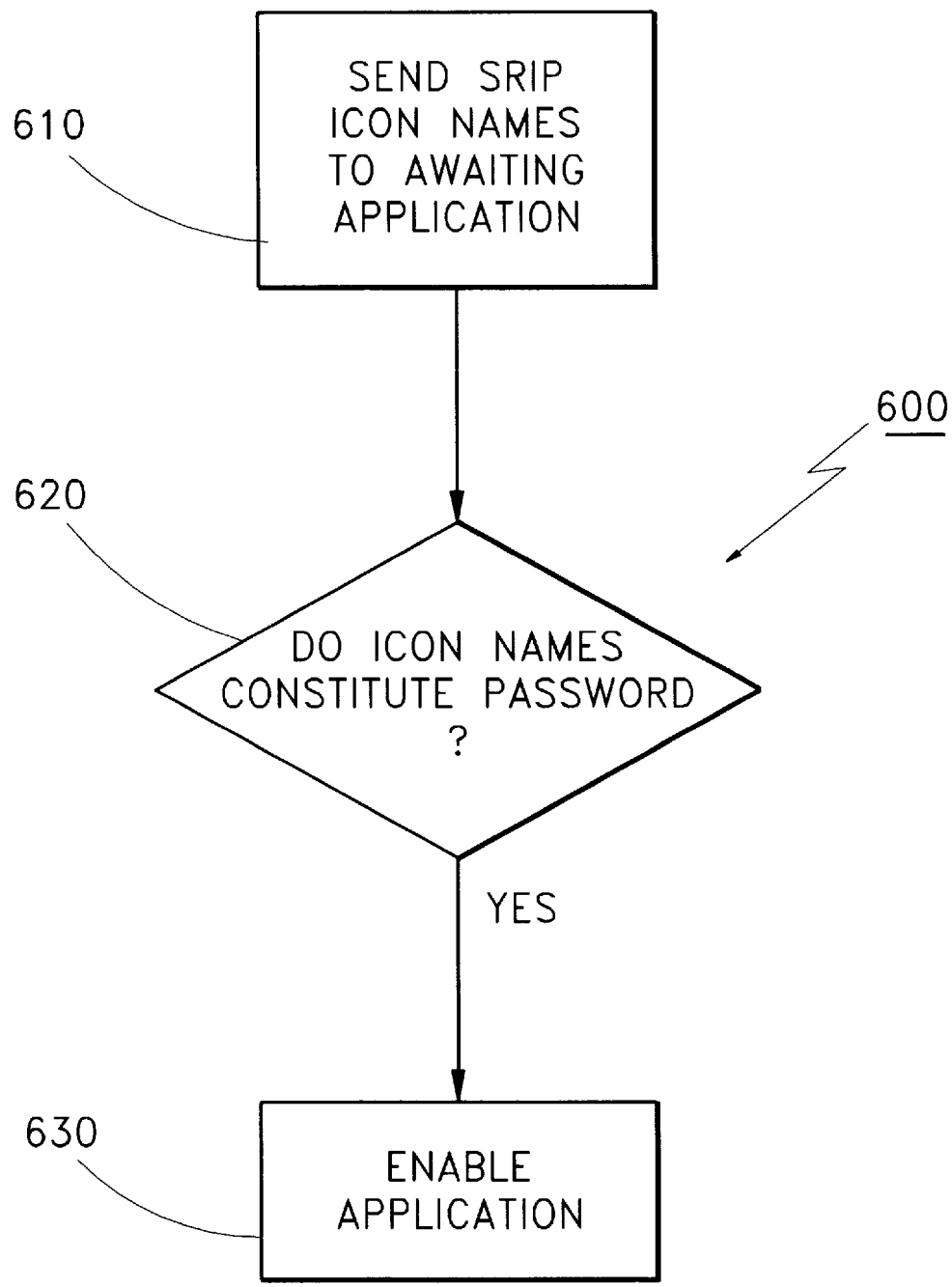
FIG. 6 is a flow chart showing the steps performed for a preferred version of the self-referential iconic password entry.

FIG. 6 is a flow chart showing the steps 600 performed for a preferred version of the self-referential iconic password entry executed by system 100 or 200.

Each time an SRIP code icon 510 is dropped on another SRIP code icon 520, then the alphanumerical names for 510 and 520 are sent 610 to the restricted function icon 262. Waiting application program 270 compares 620 the names with a table 700 containing a list of names 710 for each restricted function. This list of names constitutes a password which is entered by the drag-and-drop SRIP. (Table 700 is described below in the description of FIG. 7) If the names are correct for a particular restricted function represented by icon 262, it is enabled 630.

Figure 7:
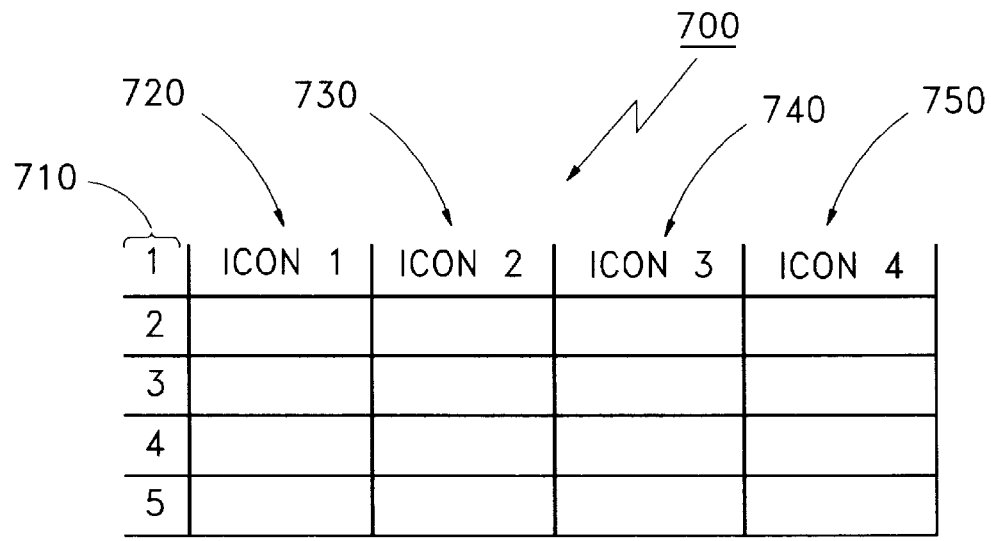
FIG. 7 is a block diagram of one typical preferred data structure that may be used to contain alphanumerical names for each restricted function requiring a password.

FIG. 7 is a block diagram of one typical preferred data structure 700 that may be used to contain alphanumerical names 710 for each restricted function requiring a password. In the SRIP, icon1 is dragged to icon2 (as described for FIG. 6) and the names of icon1 and icon 2 (720 and 730, respectively) are broadcast to the restricted function represented by icon 262 which compares these names with icon1 and icon2 (720 and 730, respectively) in the table. Additional pairs of icon names (e.g. 740 and 750) are compared until a password is complete.

When implementing the iconic password, the application program 270 needs to distinguish that an iconic password is being entered as opposed to drag-and-drop request used for other actions. Therefore, selected code icons that initiate specific actions should be avoided for the iconic passwords described above. For example, dragging a file icon on top of a trash can icon (representing a delete function) would not normally be part of an iconic password sequence to enable the deletion of files. Instead, code icons 160 would be specific icons not normally received by the restricted function icon 263.

Figure 8:
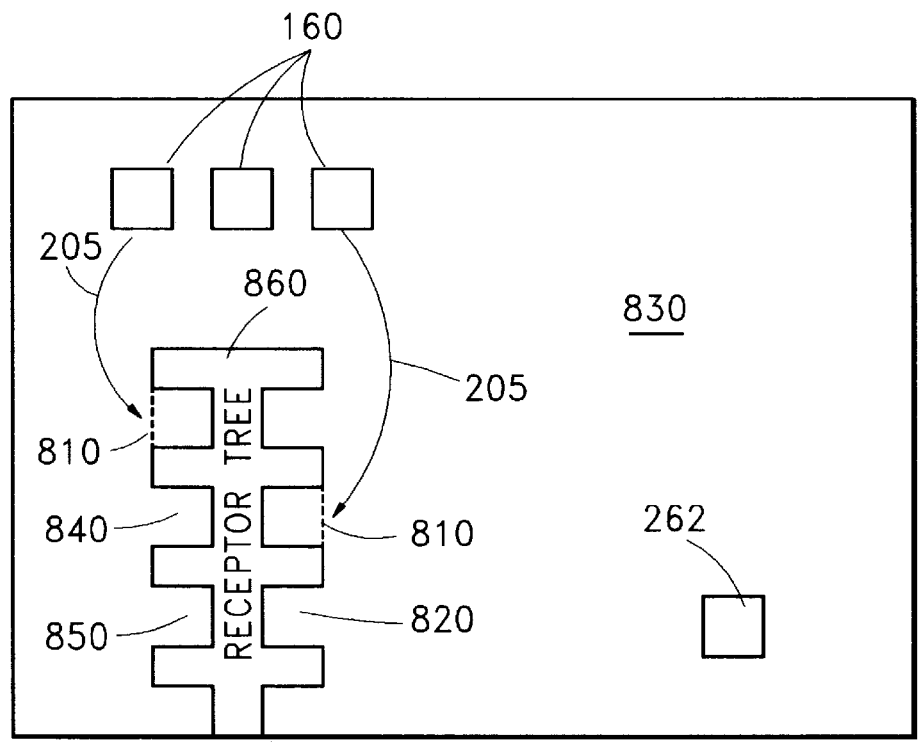
FIG. 8 is block diagram showing code icons dragged to positions in or on a "receptor tree".

FIG. 8 is block diagram of another embodiment in which code icons 160 are dragged 205 to positions 810 in or on a "receptor tree" 620. A receptor tree 620 is any graphical image to which icons can be dragged. In a preferred embodiment, the drop positions 810 are visually distinguished, such as with a cutout 820 so that the plurality of possible receptor positions 810 is evident to the user. The act of dragging code icons 160 into the appropriate positions 810 on the receptor tree 860 constitutes a "receptor tree iconic password" 830. A receptor tree may be colored, 3-dimensional, and animated. Note that some or all of the receptor positions 810 may be filled. Further, a first receptor position 840 can be filled with a first icon and then later that icon can be moved to a second receptor position 850. This allows for complicated passwords to be entered with relatively few icons 160 and receptor positions 810. Even icons with specific actions, e.g. a trash can, can be used in this receptor tree 620 embodiment because the specific action will not be invoked when the icon representing the specific action is placed in one of the receptor positions 810.

In a virtual reality space, a "virtual tree" can be created as a virtual object. For example, virtual objects can be placed in drop positions 810 of the virtual tree, e.g., by setting a table (the virtual tree), decorating the virtual tree, etc. In these applications the virtual tree can be animated and/or change with time.

Figure 9:
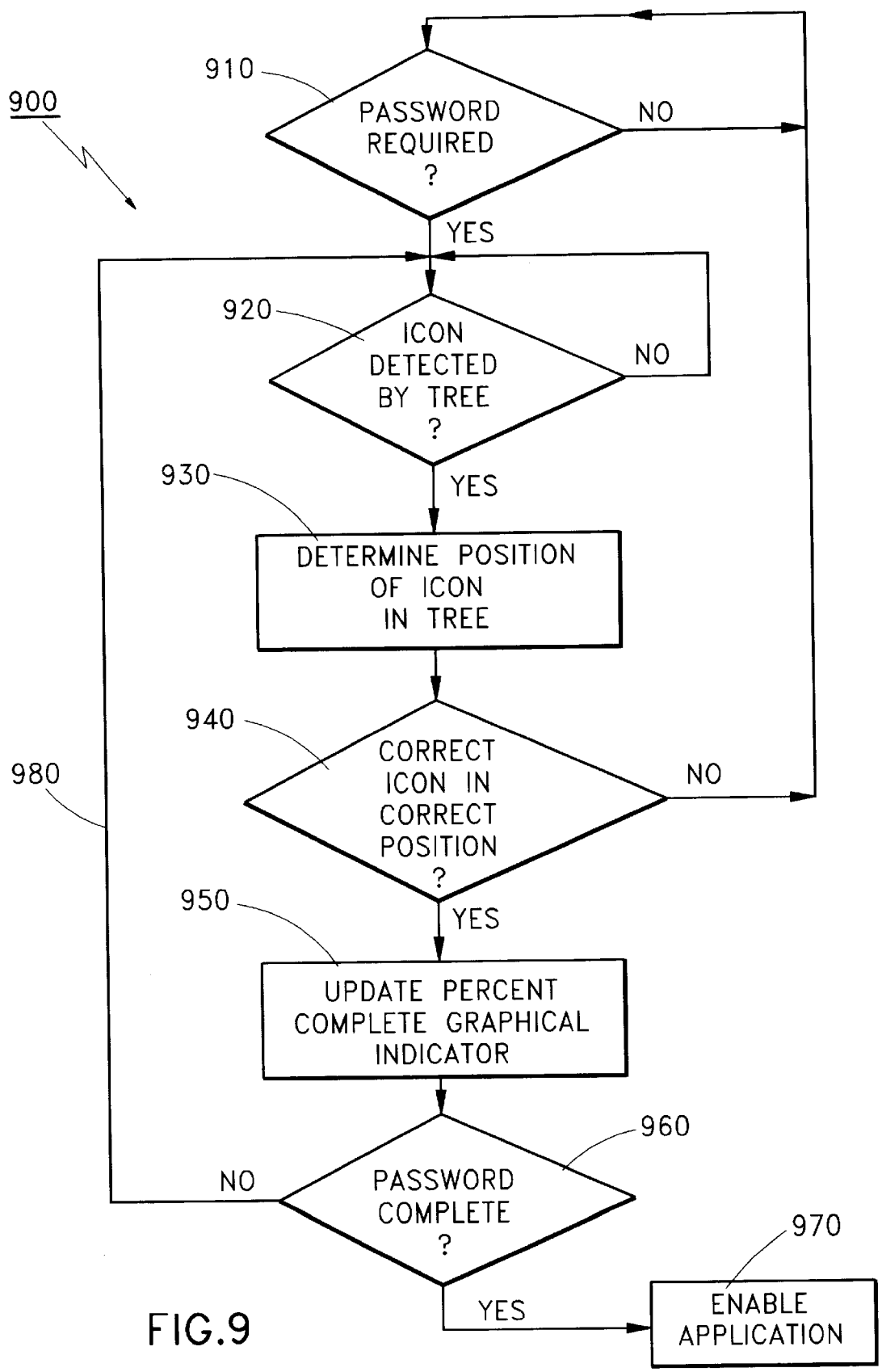
FIG. 9 is a flow chart showing the steps performed for a preferred version of the receptor tree iconic password.

FIG. 9 is a flow chart showing the steps 900 performed for a preferred version of the receptor tree iconic password executed by system 100 or 200. If an application 270 requires 910 a password, it waits for a code icon 160 to be dragged into receptor tree 860. In step 920, the tree determines if an icon has been dropped by methods described in the explanation for FIG. 3. The code icon's drop position 810 is determined in step 930 by known graphical methods, and if 940 it is in a "correct" position, a signal is sent to the percent complete graphical indicator 266 so that it is graphically updated 950 (optional). When the password is complete 960 then the restricted function represented by icon 262 is enabled 970. Otherwise 980 the application program waits for the next correct code icon 160 to be dropped into the tree (step 920.) It is possible to determine in step 940 whether the correct code icon 160 is in the appropriate receptor position 810 because each restricted function (denoted by icon 262) may contain a table in memory that lists valid receptor positions. These positions are made available to the receptor tree software using methods of interprocess communication known to those skilled in operating system programming. In addition to appropriate position 810, the receptor tree software determines if the correct icon 160 is in place by comparing the code icon name with an alphanumeric value in the restricted function's memory. Of course, such tables of values may also exist as encrypted value on disk and can be accessed accordingly.

The data file(s) 273 can be made portable and moved from machine to machine or otherwise used to customize a machine's GUI for a particular user, or to provide a common "base" data file for a company or organization. The data file (or shared memory file) can accessed across a LAN, WAN, or other network. For example, in the UNIX operating system, it is standard procedure to access remote file systems via NFS (network file system) protocols. In particular, remote files can be accessible via "Ioctl( ) function" calls.

There are many applications of the iconic password system. Consider a TV home shopping system where a parent may order certain items by dragging and dropping a sequence of icons on top of an iconic representation of a product or on top of an icon receptor tree with a pictorial representation of the product. Children would be unable to order the product because, although they may see the password icons on the screen, they will not know the sequence to use them in. The icons may be presented in a random arrangement on the screen each time they appear if desired. In this case the characteristic of the icon (e.g. color) determines the password, not the relative position in a sequence of icons.

Consider a TV movie distribution system. The parent drags and drops a sequence of icons on top of an iconic representation of a movie. The methods here would permit adults to order movies which children could not. In a similar way, access to the World Wide Web and/or other network available information (e.g. bulletin boards) can be controlled. For example, certain material available over the network would require an iconic password so that unauthorized users, e.g. children, would not have access.

This iconic password scheme is preferable to a keyboard password scheme in situations where the icons are readily accessible. If the icons are always presented in fixed locations on the screen, users may find that it is easier to remember a series of movements than a series of keystroke.

It is also easier to grab a joystick or other graphical input device, in many cases, than to reach for a keyboard.

There are applications when a keyboard is inaccessible, or even totally removed from a system and the only way to enter the password is through the icons. There are several other situations where this idea may be useful. For example, in: medical operating theaters, the cockpit of an airplane, power-plants, cars, large scale manufacturing one may have access to the icons with no keyboard. In demonstration settings (e.g. museum exhibits) there may be no keyboard available. It is possible that the gross movements required in an iconic password are easier for people with certain manual dexterity deficits, since a keyboard password requires fine movements.

Since the drag-and-drop icons may be used at anytime (i.e. the system need not be prompting the user for a password if they are always on screen) the icons could permit a hidden request for a password to privileged users. In an application program, in the normal stream of events, several icons could be present. In the normal, user-friendly mode, the user would do as suggested: select an option, hit enter to continue, etc. At this point, if a user were to point to the proper icons in password order, then he could enter a totally different part of the application program. This is useful for system maintenance and debugging. This would also be a good way to differentiate classes of users without letting one class of users even know about other classes of users. In this capacity, this is a hidden password.

Icons with images on them may be more easily remembered then numerical passwords, and this could be 'sold' as a user-friendly feature. It would be easier for the occasional user to remember a picture instead of random numbers/letters that we are so often presented with today. If an 8×8 grid of code icons were presented, choosing 10 icons in correct order would give $P(64,10)=(64!/54!=5.5\times 10^{**}17>2^{58}$ ordered combinations. This number is vastly increased using the SRIP concept.

Given this disclosure alternative equivalent embodiments would become apparent to one skilled in the art. These embodiments are also within the contemplation of the inventors.

We claim:

1. A computer system with a computer memory and a central processing system operating under an operating system with a graphical user interface having icons representing various functions to be performed, said computer system being characterized by having a security code access system comprising:
   a) code selection means including:
      i) a plurality of code icons appearing of the graphical user interface,
      ii) a plurality of target sites and
      iii) selection means for use in a security process which includes selecting two or more code icons among the plurality of code icons in a selection sequence and moving them to at least one target site of the plurality of target sites,
   b) a security code access sequence, including at least one target site, stored in the computer memory;
   c) comparison means for comparing the selection sequence to the access sequence; and
   d) a restricted function capable of being executed on the central processing unit only when the comparison means indicates that the selection sequence matches the access sequence so that access to and use of the restricted function is limited to users who select the code icons in the security code access sequence.

2. The computer system of claim 1 wherein said at least one target site is one of said code icons.

3. The computer system of claim 1 including an additional icon other than a code icon and said target site is said additional icon.

4. The computer system of claim 3 wherein the additional icon is not representative of said restricted function.

5. The computer system of claim 3 wherein said additional icon is a receptor tree icon.

6. The computer system of claim 3 wherein said additional icon is representative of the restricted function.

7. The computer system of claim 1 wherein said selection means is means for dragging and dropping the code icons on said at least one target site.

8. The computer system of claim 7 wherein said at least one target site is receptor tree icon in which there are more receptor locations than the number of code icons in the selection sequence to be placed in the receptor locations to match the security code sequence.

9. The computer system of claim 8 wherein said security code sequence includes placing each code icons in only a preselected one of said receptor locations.

10. The computer system of claim 7 wherein said security code access sequence includes a subsequence involving placing in sequence one or more code icons on a target site and said security code sequence includes said subsequence combined with at least one more target site or one more code icon.

11. In a computer system with a computer memory and a central processing system operating under an operating system with a graphical user interface having icons representing various functions to be performed, said computer system being characterized by method for a security code access procedure comprising:
   a) providing a plurality of code icons and target sites on said graphical user interface and having selection means for use in a selection process involving choosing two or more of the code icons and moving them to at least one of the target sites among the plurality of code icons and target sites in a selection sequence;
   b) storing a sequence constituting a security access code of two or more code icons and at least one target site in the computer memory;
   c) comparing the icons and at least one target site selected and the order of their selection in the selection sequence with the sequence constituting the security access code;
   d) allowing access to a restricted function only when the comparison indicates that the icons selected and the order of their selection in the selection sequence matches the access sequence to limit access to the restricted function to users selecting the code icons in the access code sequence.

12. The method of claim 11 including dragging and dropping the selected code icons on the at least one target site in the selection sequence.

13. The method of claim 12 including using a receptor tree icon which has more receptor locations than the number of code icons in the selection sequence to be placed in the receptor locations to match the security code sequence.

14. The method of claim 13 including the placement of each code icons in only a preselected one of said receptor locations.

15. The method of claim 13 wherein the security access code sequence includes a subsequence involving placing one or more code icons on a target site, wherein the security access code sequence includes combining said subsequence with at least one more target site or one more code icon in the security code sequence.

* * * * *